(12) United States Patent
Malmgren

(10) Patent No.: US 12,439,932 B2
(45) Date of Patent: Oct. 14, 2025

(54) METHOD AND A SYSTEM FOR PRODUCING A UHT MILK PRODUCT BY DIRECT UHT HEATING

(71) Applicant: Tetra Laval Holdings & Finance S.A., Pully (CH)

(72) Inventor: Bozena Malmgren, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 157 days.

(21) Appl. No.: 18/251,952

(22) PCT Filed: Nov. 25, 2021

(86) PCT No.: PCT/EP2021/083015
§ 371 (c)(1),
(2) Date: May 5, 2023

(87) PCT Pub. No.: WO2022/122401
PCT Pub. Date: Jun. 16, 2022

(65) Prior Publication Data
US 2024/0016169 A1    Jan. 18, 2024

(30) Foreign Application Priority Data
Dec. 11, 2020   (EP) ...................................... 20213421

(51) Int. Cl.
*A23B 11/137*   (2025.01)
(52) U.S. Cl.
CPC .................................. *A23B 11/137* (2025.01)

(58) Field of Classification Search
None
See application file for complete search history.

(56) References Cited

U.S. PATENT DOCUMENTS

| 5,443,857 A | 8/1995 | Arph et al. | |
| 6,761,920 B1* | 7/2004 | Kaplan | A23C 9/1524 |
| | | | 426/477 |
| 8,329,237 B2* | 12/2012 | Maron | A23B 11/12 |
| | | | 426/587 |

(Continued)

FOREIGN PATENT DOCUMENTS

| CN | 111202131 A | 5/2020 |
| EP | 2092832 A1 | 8/2009 |

(Continued)

OTHER PUBLICATIONS

International Search Report mailed Feb. 18, 2022, for priority International Application No. PCT/EP2021/083015.

*Primary Examiner* — John J Figueroa
(74) *Attorney, Agent, or Firm* — Renner, Otto, Boisselle & Sklar, LLP

(57) ABSTRACT

A system and a corresponding method for producing a UHT milk product by direct UHT heating. The method comprises feeding milk into a heating device, heating the milk by the heating device to increase a temperature of the milk to a first temperature within a range of 135 to 137° C., maintaining the milk inside the heating device at the first temperature for a first time within a range of 30 to 120 sec, feeding the heated milk into a homogenizing device, and homogenizing the heated milk by the homogenizing device, thereby producing the UHT milk product.

8 Claims, 2 Drawing Sheets

(56) References Cited

U.S. PATENT DOCUMENTS

| | | | |
|---|---|---|---|
| 8,383,185 B2* | 2/2013 | Diks | A23D 9/013 |
| | | | 426/654 |
| 2005/0112257 A1* | 5/2005 | Feldmeier | A23B 2/46 |
| | | | 426/521 |
| 2005/0112258 A1* | 5/2005 | Feldmeier | A23B 2/40 |
| | | | 426/521 |
| 2007/0110876 A1 | 5/2007 | Diks et al. | |
| 2009/0317514 A1* | 12/2009 | Sizer | A23C 1/12 |
| | | | 99/454 |

FOREIGN PATENT DOCUMENTS

| | | |
|---|---|---|
| JP | H04158762 A | 6/1992 |
| WO | 2016092067 A1 | 6/2016 |

* cited by examiner

METHOD AND A SYSTEM FOR PRODUCING A UHT MILK PRODUCT BY DIRECT UHT HEATING

TECHNICAL FIELD

The present inventive concept relates to a method and a system for producing a UHT milk product by direct UHT heating.

BACKGROUND ART

Dairy products, e.g. milk, are typically heat treated before being consumed to kill bacterial endospores and thereby increase its shelf life. A common method of heat treatment of milk is Ultra-High Temperature (UHT) processes. In UHT processes, milk is typically heated to a temperature above 135° C. UHT processes may be performed by indirect heating of milk, i.e. indirect UHT processes. UHT processes may be performed by direct heating of milk, i.e. direct UHT processes. UHT milk has a typical shelf life of six to nine months if kept unopened and at ambient conditions. Once UHT milk is opened, it needs to be refrigerated and consumed typically within seven days.

However, there is still a need to increase the shelf life of dairy products in regard to stability, particularly when the dairy products need to be stored and/or distributed at ambient condition for a longer time. Therefore, there is a need to provide a method and a system to, at least partly, address the abovementioned limitations.

SUMMARY

It is an object of the present inventive concept to at least partly overcome one or more of the above-identified limitations of the prior art. It is an object of the present inventive concept to provide a method for producing a UHT milk product by direct UHT heating to preserve stability of the UHT milk product, particularly by enzymatic inactivation, for a longer time compared to prior art. Another object of the present inventive concept is to provide a system for producing a UHT milk product which is compatible with conventional systems used for production of UHT milk by direct UHT heating.

According to a first aspect of the present inventive concept there is provided a method for producing a UHT milk product by direct UHT heating, the method comprising feeding milk into a heating device, heating the milk by the heating device to increase a temperature of the milk to a first temperature within a range of 135 to 137° C., maintaining the milk inside the heating device at the first temperature for a first time within a range of 30 to 120 sec, feeding the heated milk into a homogenizing device, and homogenizing the heated milk by the homogenizing device, thereby producing the UHT milk product.

The step of heating the milk by the heating device allows for reducing microorganisms in the UHT milk product. Thereby, the step of heating the milk allows for forming the UHT milk product produced by the direct UHT heating. The step of heating also contributes to stabilization of the UHT milk product. In particular, the steps of heating the milk to increase the temperature of the milk to the first temperature within the range of 135 to 137° C., particularly 135° C., and maintaining the milk at the first temperature for the first time within a range of 30 to 120 seconds, particularly 60-120 seconds, more particularly 60 seconds allow for reducing chemical and enzymatic reactions of the UHT milk product e.g. an improved enzymatic inactivation of the UHT milk product produced by the direct UHT heating may be achieved. For instance, the steps of heating and maintaining allow for reducing sedimentation, reducing and postponing fat separation, and/or postponing gel formation during storage of the UHT milk product. Thereby, the steps of heating and maintaining the milk allow for prolonging the stability of the UHT milk product produced by the direct UHT heating, compared to the conventionally produced UHT milk products.

The step of homogenizing the heated milk also allows for reducing a size of fat globules in the UHT milk product. The step of homogenizing hence contributes to further stabilization of the UHT milk product against e.g. sedimentation during storage. In addition, the step of homogenizing the heated milk improves sensory properties of the UHT milk product such as viscosity, taste and texture.

In addition, according to experiments carried out by the inventors, the sedimentation rate of the UHT milk product, produced according to the present inventive concept, was checked and was compared with the sedimentation rate of commercial UHT milk products. The result showed that the sedimentation rate of the UHT milk product, produced according to the present inventive concept, was significantly lower than the sedimentation rate of commercial UHT milk products. Furthermore, the result shows that the present inventive concept allows for increasing duration of the stability of the UHT milk product produced by the direct UHT heating up to one year. Hence, the UHT milk product may be stored and/or distributed at ambient condition for a longer time, compared to conventionally produced UHT milk products. The inventive concept in turn allows for producing a UHT milk product in a more environmental-friendly manner and with a lower cost by at least reducing the amount of spoiled UHT milk products which are thrown away due to passing their end of shell life. In addition, the inventive concept allows for less energy consumption, compared to conventional direct UHT heating which typically requires a higher heating temperature within the range of 140 to 150° C.

By "milk" is hereby meant a dairy product such as fresh (raw) milk, pasteurized milk or recombined milk.

By "UHT milk product" is hereby meant a direct UHT heated milk product such as direct UHT-heated semi-skimmed milk, direct UHT-heated skimmed milk or direct UHT-heated whole milk which has a duration of stability longer than the conventionally produced UHT milk products by the direct UHT heating.

The step of heating the milk by the heating device may comprise injecting steam into the milk (steam injection system). The step of heating the milk by the heating device may comprise passing the milk through an atmosphere of steam, particularly through a steam-filled vessel (steam infusion system). Thereby, the step of heating the milk by the heating device may be performed in a suitable and flexible manner.

The step of maintaining the milk inside the heating device at the first temperature may comprise passing the milk through a holding tube. Thereby, the step of maintaining the milk inside the heating device may be performed in a simple and convenient manner. The step of maintaining the milk inside the heating device for the first time within the range of 30 to 120 sec, particularly 60 to 120 sec, more particularly 60 sec may be controlled by controlling a length of the holding tube and/or a flow speed of the milk through the holding tube. Hence the time that the milk is passed through the holding tube may be controlled. For instance, a longer holding tube may be used when a longer first time of 120 sec is desired.

The method may further comprise, prior to the step of feeding the milk into the heating device, pre-heating the milk to a temperature within a range of 60 to 90° C., particularly 70 to 80° C., more particularly 75 to 80° C. Thereby, the step of pre-heating the milk may facilitate the step of heating the milk at the first temperature within the range of 135 to 137° C. In addition, the step of pre-heating the milk may allow for further reducing microorganisms in the milk.

The method may further comprise, prior to the step of feeding the milk into the homogenizing device, cooling the milk to a temperature within a range of 60 to 90° C. Thereby, the step of cooling the milk to the temperature within the range of 60 to 90° C. facilitates the step of homogenizing the heated milk. The step of cooling the milk to the temperature within the range of 60 to 90° C., similar to the pre-heating step, may avoid or at least mitigate dilution of the milk. The step of cooling the milk to the temperature within the range of 60 to 90°, particularly 70 to 80° C., more particularly 75 to 80° C. may remove added water i.e. steam which was used during heating step. This may in turn facilitate achieving the same milk composition as before the step of heating by the steam injection system or steam infusion system. The step of cooling the milk may be performed using a conventional flash cooler which may allow for achieving a high-quality UHT milk product.

The method may further comprise, subsequent to the step of homogenizing the heated milk, cooling the UHT milk product to a temperature within a range of 20 to 30° C. Thereby, the step of cooling the UHT milk product may bring the UHT milk product into ambient temperature. This may in turn further improve the stability of the UHT milk product. In addition, this may facilitate storing and/or packaging of the UHT milk product.

The method may further comprise, subsequent to the step of homogenizing the heated milk, filling the UHT milk product into an aseptic storing and/or an aseptic package. Thereby, the UHT milk product may be filled into e.g. sterilized containers under sterile conditions. This in turn facilitates provision of the shelf-stable UHT milk products that do not need refrigeration. Thereby, subsequent to the step of filling the UHT milk product into the aseptic storing and/or aseptic package, the UHT milk products may be stored and/or distributed.

According to second aspect of the present inventive concept there is provided a system for producing a UHT milk product by direct UHT heating. The system comprises a heating device, configured to heat milk to a first temperature within a range of 135 to 137° C., particularly 135° C., and to maintain the milk at the first temperature for a first time within a range of 30 to 120 sec, and a homogenizing device, configured to homogenize the heated milk. This aspect may generally present the same or corresponding advantages as the first aspect. In addition, the system is compatible with conventional systems used for the production of UHT milk by direct UHT heating.

The heating device may comprise a steam injection system or a steam infusion system adapted to heat the milk to the first temperature.

The heating device may comprise a holding tube adapted to maintain the milk at the first temperature by passing the milk through the holding tube. Thereby, the holing tube may provide desired performance, long production time and low maintenance costs.

A length of the holding tube and/or a flow speed of the milk through the holding tube may be adapted to control the first time which is needed to pass the milk through the holding tube. The holding tube may comprise straight and corrugated tubes. Thereby, the length of the holding tube e.g. number of the corrugated tubes may be decreased or increased to adjust the length of the holding tube and to maintain the milk inside the holding tube for the first time within the range of 30 to 120 sec, particularly 60 to 120 sec, more particularly 60 sec.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
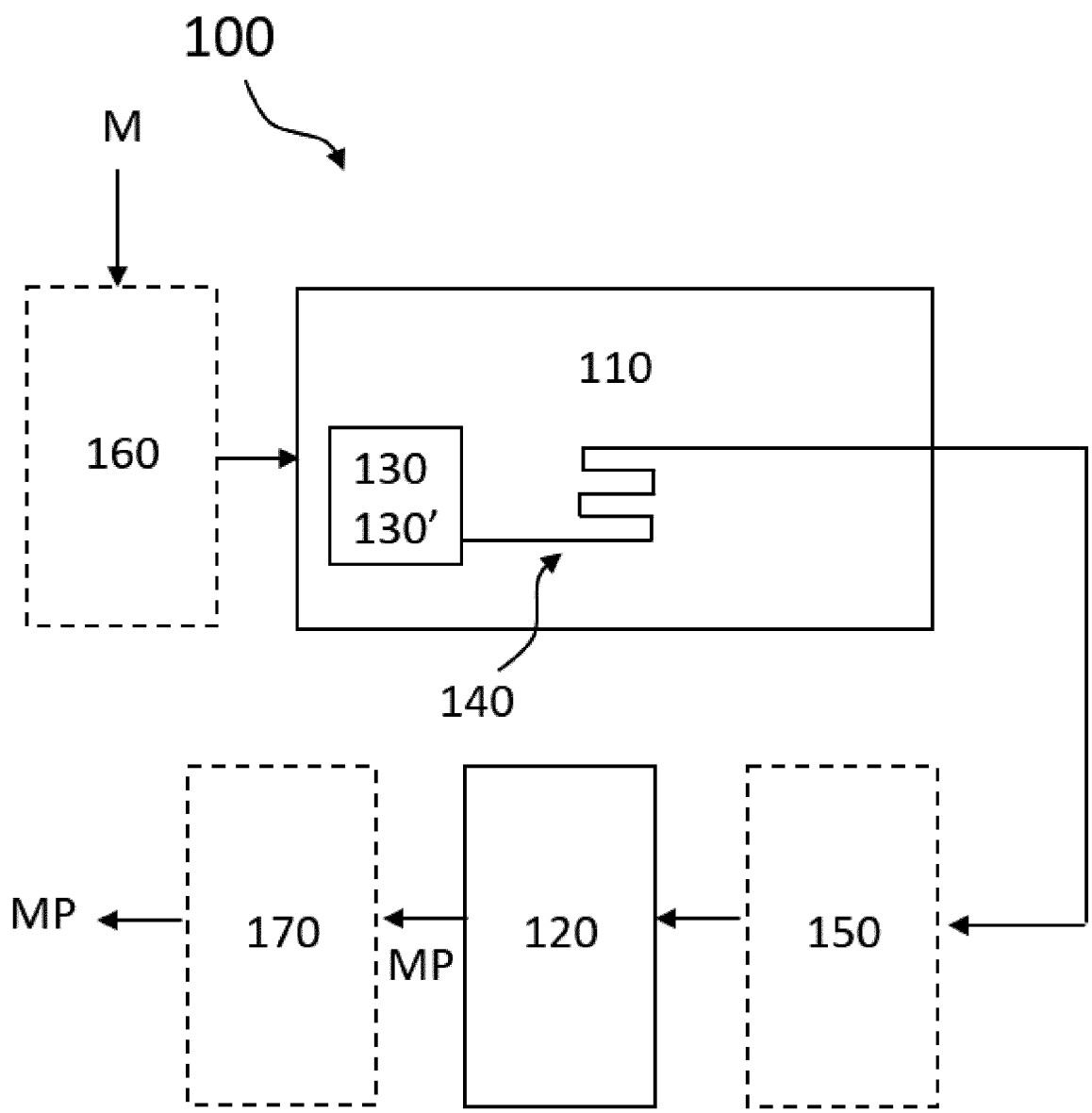
FIG. 1 is a schematic illustration of a system for producing a UHT milk product by direct UHT heating.
Figure 2:
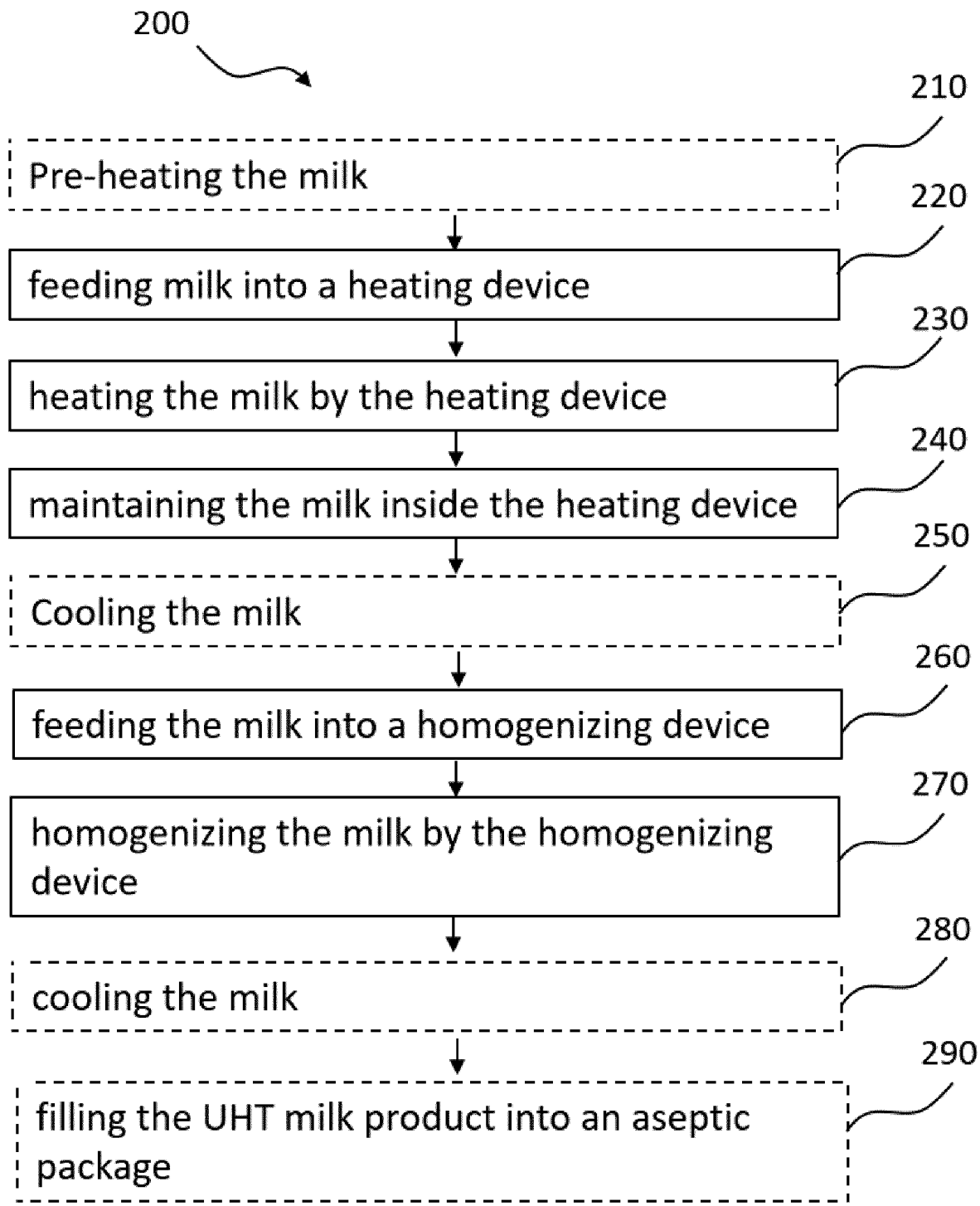
FIG. 2 is a block scheme of a method for producing a UHT milk product by direct UHT heating.

With reference to FIG. 1, a system 100 is illustrated. With reference to FIG. 2, a method 200 is illustrated. The system 100 may be used to produce a UHT milk product MP from milk M by direct UHT heating. In the following, milk M and the system 100 in relation to producing the UHT milk product MP from the milk M will be described.

FIG. 1 shows that the system 100 comprises a pre-heating device 160. The system 100 does not need to comprise a pre-heating device 160. FIG. 1 shows that milk M is fed into the pre-heating device 160. The pre-heating device 160 may be any conventional and commercially available pre-heating device. The pre-heating device 160 may pre-heat 210 the milk M in a manner which per se is known in the art. For instance, the pre-heating device 160 may be e.g. a tube type heat exchanger. The tube type heat exchanger may comprise straight and corrugated tubes. Alternatively, the pre-heating device 160 may be a plate type heat exchanger. The pre-heating device 160 may comprise a plurality of heat exchangers of different types. The pre-heating device 160 may pre-heat 210 the milk M to a temperature within a range of 60 to 90° C., particularly 70 to 80° C., more particularly 75 to 80° C.

FIG. 1 further shows that the system 100 comprises a heating device 110. FIG. 1 shows that the heating device 110 is arranged downstream the pre-heating device 160. The heating device 110 is configured to heat 230 the milk M. The heating device 110 is configured to heat 230 the milk M to a first temperature within a range of 135 to 137° C., particularly 135° C. The heating device 110 is further configured to maintain 240 the milk M at the first temperature for a first time within a range of 30 to 120 sec, particularly 60 to 120 sec, more particularly 60 sec. The heating device 110 may comprise a steam injecting system 130 or a steam infusing system 130'. The steam injecting system 130 or the steam infusing system 130' may be adapted to heat 230 the milk M to the first temperature within the range of 135 to 137° C. The steam injecting system 130 or the steam infusing system 130' may be adapted to increase the temperature of the milk M to the range of 135 to 137° C. The heating device 110 may further comprise a holding tube 140. The holding tube 140 may be adapted to maintain 240 the milk M at the first temperature. The holding tube 140 may comprise straight and corrugated tubes such that the milk M may be passed through the holding tube 140. A length of the holding tube 140 may be adapted to pass the milk M through the holding tube 140 for the first time within the range of 30 to 120 sec. For instance, number of the corrugated tubes may be decreased or increased to adjust the length of the holding tube 140 and to maintain the milk M inside the holding tube for the first time within the range of 30 to 120 sec. The heating device 110 may comprise a plurality of steam injecting systems 130 and/or the steam infusing systems 130'. The heating device 110 may be any other conventional and commercially available heating device, used in the direct UHT heating.

FIG. 1 further shows that the system 100 further comprises a first cooling device 150. FIG. 1 shows that the first cooling device 150 is arranged downstream the heating device 110. The first cooling device 150 may be any conventional and commercially available cooling device, used in the direct UHT heating. The first cooling device 150 may cool 250 the milk M in a manner which per se is known in the art. For instance, the first cooling device 150 may be a conventional flash cooler. The first cooling device 150 may cool 250 the milk M to a temperature within a range of 60 to 90° C., particularly 70 to 80° C., more particularly 75 to 80° C.

FIG. 1 further shows that the system 100 comprises a homogenizing device 120. FIG. 1 shows that the homogenizing device 120 is arranged downstream the cooling device 150. The homogenizing device 120 is configured to homogenize 270 the heated milk M. The homogenizing device 120 may be any conventional and commercially available homogenizing device, used in the conventional UHT process. The homogenizing device 120 may homogenize 270 the heated milk M in a manner which per se is known in the art. The homogenizing device 120 may be configured to homogenize 270 the heated milk M at a temperature within a range of 60 to 90° C., particularly 70 to 80° C., more particularly 75 to 80° C. The homogenizing device 120 may be configured to homogenize 270 the heated milk at a pressure within a range of 180 to 250 bar. FIG. 1 further shows that a UHT milk product MP is produced at an outlet of the homogenizing device 120.

FIG. 1 further shows that the system 100 comprises a second cooling device 170. FIG. 1 shows that the second cooling device 170 is arranged downstream the homogenizing device 120. The second cooling device 170 may cool 280 the UHT milk product MP to a temperature within a range of 20 to 30° C. The second cooling device 170 may be any conventional and commercially available cooling device, used in the conventional UHT process. The second cooling device 170 may cool 280 the UHT milk product M in a manner which per se is known in the art e.g. indirect cooling. Subsequent to the cooling 280 of the UHT milk product MP, the UHT milk product MP may be filled 290 into an aseptic storing and/or aseptic package. Such packaged UHT milk product MP may be stored or distributed. A duration of the stability of the UHT milk product MP may be up to one year. In other words, the UHT milk product MP may be kept unopened and at ambient conditions up to one year.

FIG. 2 illustrates a block scheme of a method 200 for producing a UHT milk product MP by direct UHT heating. The method 200 may comprise pre-heating 210 milk M to a temperature within a range of 60 to 90° C., particularly 70 to 80° C., more particularly 75 to 80° C. The step of pre-heating 210 milk M may be performed in a similar manner, as described above. The step of pre-heating 210 milk M may be performed using a pre-heating device 160, as described above. The step of pre-heating 210 milk M may be performed prior to a following step of feeding 220 the milk M into the heating device 110.

FIG. 2 further shows that the method 200 comprises feeding 220 the milk M into a heating device 110. The step of feeding 220 the milk M into a heating device 110 may be performed in a manner which per se is known in the art. The method 200 further comprises heating 230 the milk M by the heating device 110 to increase a temperature of the milk M to a first temperature within a range of 135 to 137° C., particularly 135° C. The step of heating 230 the milk M by the heating device 110 may comprise injecting steam into the milk M. The step of heating 230 the milk M by the heating device 110 may comprise passing the milk M through an atmosphere of steam, particularly through a steam-filled vessel. The step of heating 230 the milk M may be performed in a similar manner, as described above.

FIG. 2 further shows that the method 200 comprises maintaining 240 the milk M inside the heating device 110 at the first temperature for a first time within a range of 30 to 120 sec, particularly 60-120 seconds, more particularly 60 seconds. The step of maintaining 240 the milk M inside the heating device 110 at the first temperature may comprise passing the milk M through a holding tube 140. The step of maintaining 240 the milk M inside the heating device 110 may be performed in a similar manner, as described above.

FIG. 2 further shows that the method 200 further comprises cooling 250 the milk M to a temperature within a range of 60 to 90° C., particularly 70 to 80° C., more particularly 75 to 80° C. The step of cooling 250 the milk M may be performed, as described above. The step of cooling 250 the milk M may be performed using a first cooling device 150, as described above. The step of cooling 250 the milk M may be performed prior to a following step of feeding 260 the milk M into the homogenizing device 120.

FIG. 2 further shows that the method 200 comprises feeding 260 the heated milk M into a homogenizing device 120. The step of feeding 260 the heated milk M into a homogenizing device 120 may be performed in a manner which per se is known in the art. The method 200 further comprises homogenizing 270 the heated milk M by the homogenizing device 120. The step of homogenizing 270 the heated milk may be performed, as described above. The step of homogenizing 270 the heated milk may be performed using the homogenizing device 120, as described above.

FIG. 2 further shows that the method 200 further comprises, subsequent to the step of homogenizing 270 the heated milk M, cooling 280 the UHT milk product MP to a temperature within a range of 20 to 30° C. The step of cooling 280 the UHT milk product MP may be performed, as described above. The step of cooling 280 the UHT milk product MP may be performed using the second cooling device 170, as described above. The method 200 may further comprise adding flavors and/or tastes into the UHT milk product MP. The method 200 may further comprise subsequent to the step of homogenizing 270 the heated milk M, filling 290 the UHT milk product MP into an aseptic storing and/or aseptic package. The step of filling 290 the UHT milk product MP into the aseptic storing and/or aseptic package may be performed subsequent to the step of cooling 280 the UHT milk product MP. The step of filling 290 the UHT milk product MP into the aseptic storing and/or aseptic package may be performed in a manner which per se is known in the art.

From the description above follows that, although various variants of the inventive concept have been described and shown, the inventive concept is not restricted thereto, but may also be embodied in other ways within the scope of the subject-matter defined in the following claims.

The invention claimed is:

1. A method for producing a UHT milk product by direct UHT heating, the method comprising the following steps performed in sequential order:
feeding milk into a heating device,
heating the milk by the heating device to increase a temperature of the milk to a first temperature within a range of 135 to 137° C.,
maintaining the milk inside the heating device at the first temperature for a first time within a range of 30 to 120 sec,
feeding the heated milk into a homogenizing device, and
homogenizing the heated milk by the homogenizing device, thereby producing the UHT milk product.

2. The method according to claim 1, wherein the step of heating the milk by the heating device comprises injecting steam into the milk.

3. The method according to claim 1, wherein the step of heating the milk by the heating device comprises passing the milk through an atmosphere of steam.

4. The method according to claim 1, wherein the step of maintaining the milk inside the heating device at the first temperature comprises passing the milk through a holding tube.

5. The method according to claim 1, wherein the method further comprises, prior to the step of feeding the milk into the heating device, pre-heating the milk to a temperature within a range of 60 to 90° C.

6. The method according to claim 1, wherein the method further comprises, prior to the step of feeding the milk into the homogenizing device, cooling the milk to a temperature within a range of 60 to 90° C.

7. The method according to claim 1, wherein the method further comprises, subsequent to the step of homogenizing the heated milk, cooling the UHT milk product to a temperature within a range of 20 to 30° C.

8. The method according to claim 1, wherein the method further comprises, subsequent to the step of homogenizing the heated milk, filling the UHT milk product into an aseptic storing and/or an aseptic package.

* * * * *